United States Patent [19]
Palmer et al.

[11] Patent Number: 5,974,301
[45] Date of Patent: Oct. 26, 1999

[54] FREQUENCY CANCELLING SYSTEM AND METHOD

[75] Inventors: John P. Palmer, Pomona; Mohammad A. Asgari, Canyon Country, both of Calif.

[73] Assignee: Ludwig Kipp, Palm Beach, Fla.

[21] Appl. No.: 08/714,321

[22] Filed: Sep. 18, 1996

[51] Int. Cl.$^6$ .................................................. H04B 15/00
[52] U.S. Cl. ............................................. 455/63; 455/304
[58] Field of Search ................................. 455/24, 63, 296, 455/501, 67.3, 303, 304, 305, 41, 138, 139, 278.1, 273, 137, 276.1; 342/51; 340/825.54

[56] References Cited

U.S. PATENT DOCUMENTS

| | | |
|---|---|---|
| 3,757,235 | 9/1973 | McCormick . |
| 4,268,793 | 5/1981 | Amazawa et al. . |
| 4,272,846 | 6/1981 | Muratani et al. . |
| 4,300,020 | 11/1981 | Toyomaki . |
| 4,317,217 | 2/1982 | Davidson et al. ................ 455/24 |
| 4,459,474 | 7/1984 | Walton . |
| 4,989,262 | 1/1991 | Saito . |
| 5,105,435 | 4/1992 | Stilwell . |
| 5,109,532 | 4/1992 | Petrovic et al. . |
| 5,109,533 | 4/1992 | Mine et al. . |
| 5,140,699 | 8/1992 | Kozak ................................ 455/296 |
| 5,251,328 | 10/1993 | Shaw . |
| 5,325,394 | 6/1994 | Bruckert . |
| 5,361,400 | 11/1994 | Kazecki et al. . |
| 5,369,791 | 11/1994 | Asghar et al. . |
| 5,406,133 | 4/1995 | Watanabe et al. .................... 455/278.1 |
| 5,428,831 | 6/1995 | Monzello et al. .................. 455/296 |
| 5,548,838 | 8/1996 | Talwar et al. ...................... 455/296 |

*Primary Examiner*—Nguyen Vo
*Attorney, Agent, or Firm*—Amster & Rothstein & Ebenstein

[57] ABSTRACT

A frequency cancelling system is disclosed which improves reception of a communication signal which is transmitted at a communication frequency in the presence of an interference signal which occurs at the same communication frequency. The frequency cancelling system generates a reference signal at the communication frequency, and adjusts the reference signal to be opposite in phase and equal in amplitude to the interference signal. The reference signal and the communication signal are then combined to cancel the interference signal. In a preferred embodiment, the reference signal is generated from the same source as that from which the interference signal arises. Preferably, the interference signal is received during an interval in which the communication signal is not being transmitted, and the reference signal is adjusted to be opposite in phase and equal in amplitude to the interference signal during that interval.

6 Claims, 3 Drawing Sheets

FREQUENCY CANCELLING SYSTEM AND METHOD

The present invention relates to a frequency cancelling system and more specifically to a system and method which cancels an interference signal to permit a communication signal lying at the same frequency to be received and processed.

A number of systems exist which cancel interference frequencies which originate from independent transmission sources in the environment. For example, U.S. Pat. No. 3,757,235 describes an interference frequency cancelling system for a seismic test instrument which detects an ambient power line frequency and generates a cancelling signal to compensate for when seismic test readings are taken. That system includes analog circuitry for generating a cancelling signal which is equal in level and opposite in phase with respect to the detected power line frequency. However, that system requires manual set-up and verification, and, while apparently adequate for the purpose of improving the quality of seismic test recordings having analog low frequency signals, is ill-adapted or inadequate for cancelling interference frequencies which are related to communication frequencies. Moreover, that system would be inappropriate where ease and speed of set-up are important. The frequency cancelling system disclosed herein addresses these considerations.

Another existing system is described in U.S. Pat. No. 4,989,262 to Saito (the "Saito Patent") and incorporates a demodulator which has a plurality of interference cancellers for eliminating interference frequency components from a received signal. In that system, interference frequency components are determined by feedback control circuitry which correlates components of the received input signal with error signal components generated by delaying the received input signal. Because the system described in the Saito Patent relies on manipulating the received input signal which contains both the interference signal and the communication signal, that system is incapable of cancelling an interference signal which lies at the same frequency as the communication signal sought to be received.

The need exists, therefore, for a frequency cancelling system which permits a communication signal to be received and processed in the presence of an interference signal which lies at the same frequency. Existing systems do not provide a way to perform such frequency cancellation.

Such an interference frequency cancelling system is advantageously applied to a radio frequency communication system which includes a transceiver and a plurality of radio frequency identification (RFID) tags located at randomly determined distances from between a few centimeters to one or more meters away from the transceiver, which communicate information to the transceiver. In such communication system, the transceiver transmits a signal at a fundamental RF frequency, and the RFID tags generate a frequency at a harmonic of that fundamental frequency, and modulate the harmonic frequency with information-containing communication signals for transmission back to the transceiver. In such communication system, each RFID tag transmits its information-containing signal at a different randomly determined time, such that the transceiver must only receive and process one such communication signal at a time.

However, while not transmitting communication signals, the RFID tags emit a steady quantum of RF signal energy at the harmonic frequency. Due to such emissions and the geometry of the system in which some of the RFID tags are positioned one or more orders of magnitude closer to the transceiver than other RFID tags, the harmonic signal energy emitted at a given time by RFID tags positioned near the transceiver can inhibit the reception of information-containing communications signals transmitted by other more distantly-positioned RFID tags.

Accordingly, it is an object of the invention to provide a frequency cancelling system for cancelling an interference signal from a received input signal, thereby permitting a communication signal having the same frequency to be correctly received and processed.

A further object of the invention is to provide a system which provides more rapid and accurate generation of a frequency cancelling signal to be combined with a received input signal to cancel an interference signal therefrom.

Still another object of the invention is to provide frequency cancelling system having improved operating performance through its continuous generation of a frequency cancelling signal from the same RF signal source from which the interference signal arises.

SUMMARY OF THE INVENTION

These and other objects are provided by the frequency cancelling system and method of the present invention. The system operates by generating a phase-adjusted frequency cancelling signal for use in combining with a received input signal to eliminate the interference signal component therefrom.

During an adjustment phase of operation prior to receiving one or more communication signals, the interference frequency cancelling system receives an input signal which contains the interference signal. Based on that input signal, the system automatically adjusts the amplitude and phase of a locally generated reference signal to have the same amplitude and to be opposite in phase with respect to the interference signal. Then, during a communication phase of operation, the amplitude and phase of the reference signal are held constant, such that when the reference signal is combined with the received input signal, the interference signal is cancelled therefrom.

The frequency cancelling system of the present invention is advantageously included in a controlling transceiver of radio frequency communication system, the controlling transceiver being used to. communicate information with a plurality of responding transceivers which may be, for example, radio frequency identification (RFID) tags. In such communication system, the controlling transceiver transmits a signal at a fundamental frequency to the responding transceivers. In return, the controlling transceiver receives a radio frequency (RF) input signal which includes both information-containing signal transmissions, and interfering emissions made by the responding transceivers on a return frequency which stands in predetermined relation to the fundamental frequency, the return frequency being, for example, a harmonic of the fundamental frequency.

In such communication system, the controlling transceiver transmits a signal signalling all of the responding transceivers to commence operations simultaneously. Each responding transceiver transmits an information-containing communication signal at the return frequency, for reception by the controlling transceiver at a randomly determined time after commencing operation. However, as soon as the responding transceivers commence operation, each of the responding transceivers immediately begins emitting an undesired steady quantum of signal energy at the return frequency. Owing to the placement of the responding transceivers relative to each other and the interrogation transceiver, and the relative strength of the undesired emissions, the undesired emissions may prevent some of the information-containing communication signals from being accurately detected. The frequency cancelling system of the present invention operates upon the received information-containing communication signal to eliminate the interference frequency component which results from the undesired emissions, thereby improving the reception and processing of communication signals transmitted at the same frequency.

As used in the above-described communication system, in a first adjustment phase of operation of the present invention, the controlling transceiver transmits an unmodulated RF carrier signal at a fundamental frequency and receives an RF input signal which contains an interference signal being the sum of the undesired emissions at the return frequency. The received RF input signal is coupled to a bandpass filter which outputs a band-limited signal containing the interference signal. The interference signal is then converted to intermediate frequency (IF) and coarsely adjusted in level by a digitally controlled attenuator in feedback relation with a voltage-reference level detector.

In a second adjustment phase of operation, the level of the IF converted interference signal is held constant, and an intermediate frequency (IF) reference signal is generated and adjusted to be 180° out of phase with respect to the IF converted interference signal. The IF reference signal is generated from a source of the same fundamental frequency used for transmitting communications by the controlling transceiver. Circuitry provided in the frequency cancelling system shifts that fundamental frequency to the harmonic return communication frequency (which is the same as the frequency of the undesired emissions) and downconverts the return communication frequency to intermediate frequency (IF). The IF reference signal is then adjusted to be 180° out of phase with respect to the IF interference signal by a phase detector operated in feedback relation with a digitally controlled phase shifter.

In a third adjustment phase of operation, the phase of the IF reference signal is held constant and a final receiver gain adjustment is made with respect to the level of the IF interference signal. The IF interference signal and the IF reference signal are each input to a level comparator. The resulting difference signal is input to a sequential control unit which controls the gain of an attenuator to adjust the level of the IF interference signal to equal the level of the IF reference signal. The gain setting of the controlled attenuator is thereafter maintained during the communication phase of operation at the setting established at this final adjustment phase of operation. In this manner, the interference signal component, assuming it has not changed in relative amplitude or phase, is cancelled from the received input signal during that communication phase.

The foregoing automatic adjustment process results in an IF reference signal which is opposite in phase and equal in level to the IF interference signal, the IF reference signal thereby being capable of cancelling the IF interference signal component from a received input signal. In a preferred embodiment of the interference frequency cancelling system, an automatically controlled switch disconnects the IF reference signal from the combining circuitry when the level of the interference signal lies below a predetermined level, i.e. when the interference signal level approaches the system noise level.

DETAILED DESCRIPTION OF THE PREFERRED EMBODIMENT

The advantages of the present invention are realized in a communication system in which a controlling radio frequency transceiver communicates information with a plurality of information transmitting radio frequency tag devices (RFID tags). Typical applications for this system include inventory control and check-out systems. Other potential applications include livestock and security control and monitoring systems. In such communication system, many articles, or beings, bearing RFID tags are positioned randomly with respect to each other, some tags being positioned as much as one or more orders of magnitude farther away from the controlling transceiver than others. Consequently, for permitting the reception of communication signals from both closely positioned and relatively distant RFID tags, the present invention actively compensates for the interference signals emitted by RFID tags.

Figure 1:
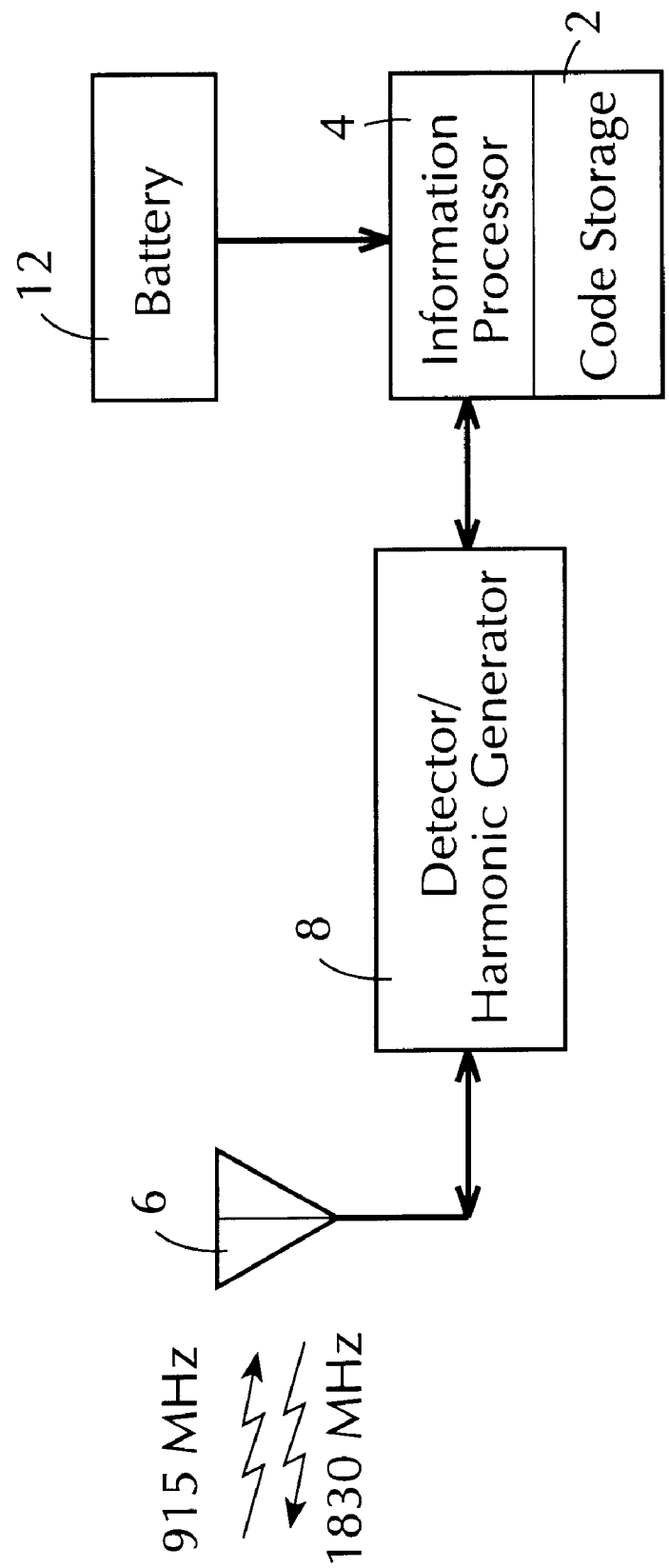
FIG. 1 is a block and schematic diagram of a radio frequency identification (RFID) tag adapted to communicate with a transceiver incorporating the frequency cancelling system of the present invention.

FIG. 1 is a block and schematic diagram of an RFID tag which communicates with a radio frequency transceiver incorporating the present invention. As shown in FIG. 1, the RFID tag is an active device which contains a processor 4 and local storage 2. The local storage 4 stores an identification code used to uniquely identify an article or being (e.g., person, animal) which is associated with the RFID tag. Processor 2 executes one or more control and communication algorithms to communicate information and control statements with the controlling transceiver.

The RFID tag also includes a radio frequency (RF) antenna 6, and an RF signal detector and harmonic generator, 8. The RF signal detector/harmonic generator 8 demodulates RF signals received from antenna 6 to baseband for use by processor 4. The RF detector/harmonic generator also generates a signal frequency at a second harmonic of the RF carrier that is received from the RF interrogation transceiver and modulates that harmonic signal frequency under the control of processor 4 with information signals which are output by processor 4. Preferably, the RF signal detector/harmonic generator 8 operates in a low power state when not being used to modulate the harmonic frequency, and couples only a small amount of the received signal power in the reflected harmonic in such state. Preferably the RF signal detector/harmonic generator 8 also has a high power state in which it couples a larger amount of the received signal power into the harmonic frequency signal while modulating that harmonic frequency signal with information signals. For the instant application, the preferred modulation process is amplitude-modulation.

Although the signal power transmitted by the RFID tags is generated by a source located in the controlling transceiver, a battery 12 is present in each RFID tag to supply the current to operate processor 4 and to maintain the contents of the local storage 2 in RFID tags when such storage is rewriteable and volatile.

In operation, an RFID tag receives signals modulated at the fundamental RF carrier frequency at RF signal detector/harmonic generator 8 from antenna 6. RF signal detector 8 demodulates the RF input signal to baseband and delivers the resultant control or information signal to processor 4. Through execution of control and communication algorithms, processor 4 causes control and information signals, such as, for example, the identification code stored in local storage 2, to be modulated onto a second harmonic of the fundamental RF carrier. However, when the RF signal detector/harmonic generator 8 is not being used to modulate that harmonic frequency for transmitting information signals to the controlling transceiver, it still emits undesired signal energy at the harmonic transmission frequency, such that if an RFID tag is located in close relative proximity to the controlling transceiver, the undesired emissions of that RFID tag can inhibit the information-containing signals transmitted by other more distantly located RFID tags from being received and processed correctly.

Figure 2:
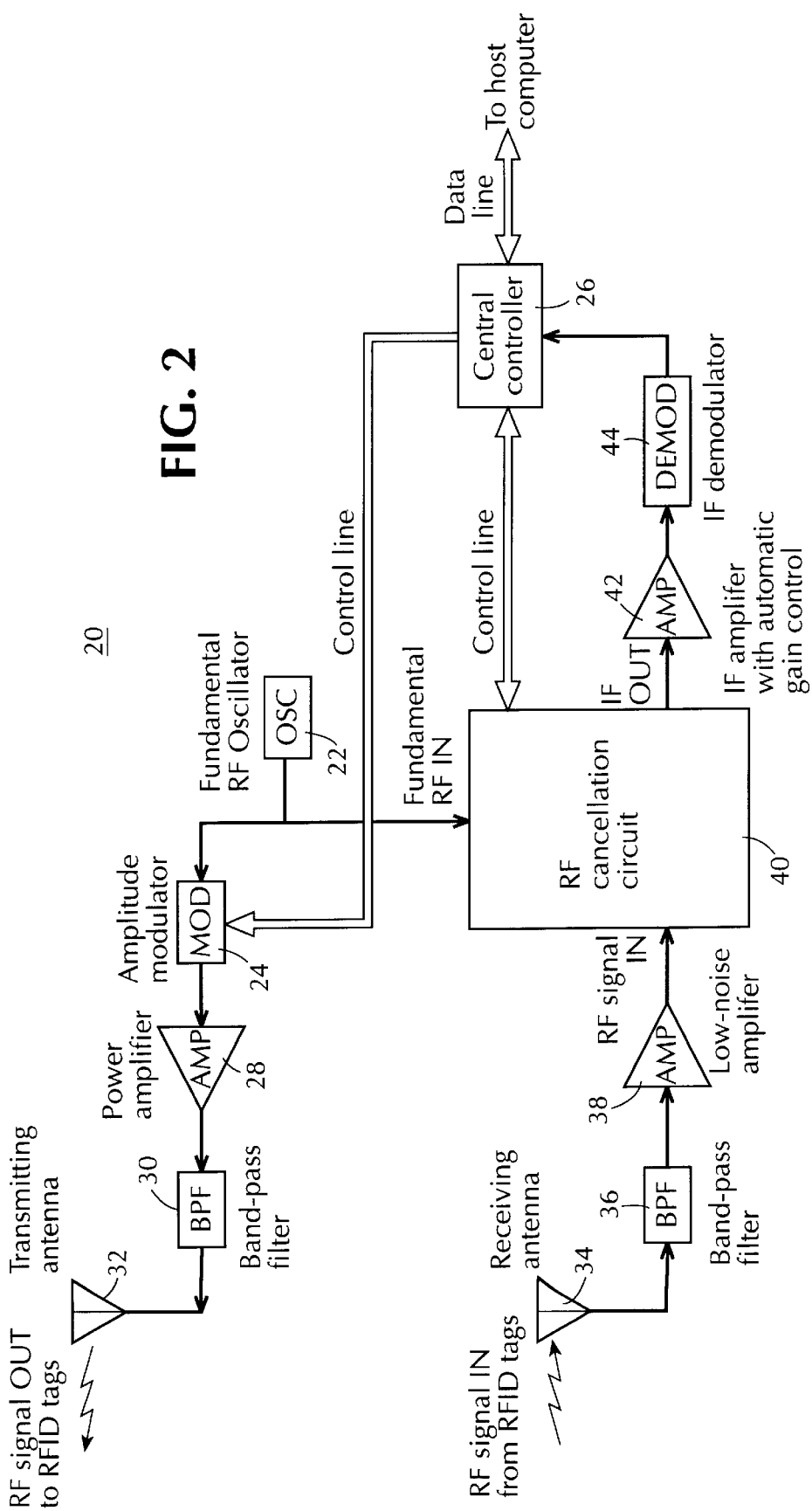
FIG. 2 is a block and schematic diagram of a radio frequency transceiver containing the frequency cancelling system of the present invention.

FIG. 2 is a block and schematic diagram of a radio frequency (RF) transceiver 20 in which the frequency cancelling system of the present invention is incorporated. As shown in FIG. 2, the transceiver includes radio frequency (RF) oscillator 22 which generates the fundamental RF carrier used for transmitting signals to the RFID tags. The transmitting circuitry of the transceiver includes an amplitude modulator 24 which modulates the RF carrier with signals generated by control processor 26. An amplifier 28, bandpass filter 30, and transmitting antenna 32, are coupled to respectively amplify, filter and transmit the modulated RF carrier over the air.

The receiving circuitry of the transceiver 20 includes a receiving antenna 34, a first bandpass filter 36, and an amplifier 38 for coupling the RF signals transmitted (or emitted as interference) from the RFID tags to a frequency cancelling circuit 40 constructed in accordance with the present invention. The frequency cancelling circuit 40 receives the fundamental RF carrier from RF oscillator 22 and exchanges control signals with control processor 26 over a control interface. The frequency cancelling circuit 40 produces a downconverted intermediate frequency (IF) output which is coupled to an automatic gain-controlled (AGC) amplifier 42 which, in turn, provides a controlled amplitude IF signal to IF demodulator 44. IF demodulator, in turn, delivers demodulated control and information signals to control processor 26. Control processor 26 is connected to an external host computer (not shown) over a communication interface, so as to permit the exchange of information concerning the reading and/or writing of RFID tag information.

In operation, when reading the RFID tags associated with a group of randomly disposed articles, the control processor 26 outputs a control and modulating signal to amplitude modulator 24 which, in turn, modulates the fundamental RF carrier output of RF oscillator 22. The modulated RF signal is then amplified by amplifier 28, band-limited to frequencies close to that fundamental RF carrier frequency by bandpass filter 30, and then transmitted by antenna 32 to the RFID tags.

Signals returning from the RFID tags are received by receiving antenna 34, band-limited to frequencies. close to the return transmission frequency (preferably the second harmonic of the fundamental RF frequency) by bandpass filter 36, and then amplified by amplifier 38 at the input to the frequency cancelling circuit 40. Frequency cancelling circuit 40 compensates for interference generated by non-transmitting RFID tags and downconverts the band-limited RF harmonic signal to intermediate frequency (IF).

Figure 3:
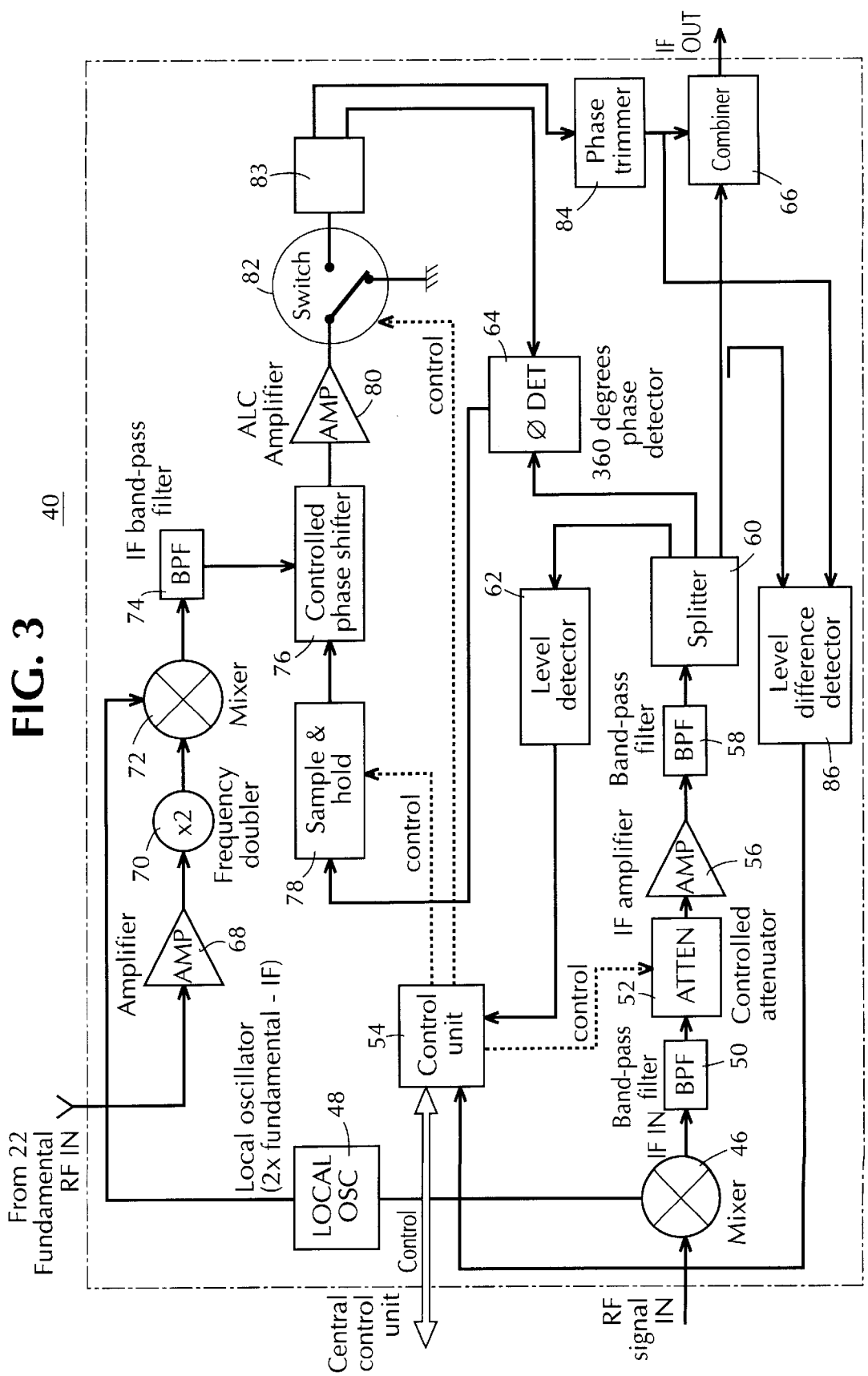
FIG. 3 is a block and schematic diagram of a radio frequency cancelling system of the present invention.

FIG. 3 shows a block and schematic diagram of the preferred frequency cancelling circuit 40 of the present invention. At the input to the frequency cancelling circuit 40 is a mixer 46 which multiplies the incoming RF frequency harmonic signal with a mixing frequency output of local oscillator 48 at twice the fundamental RF frequency minus the intermediate frequency (IF). A bandpass filter 50 selects the resulting downconverted IF signal and couples it to a controlled attenuator 52. The controlled attenuator 52 alters the IF signal level under control of control unit 54 which operates in communicative relation with control processor 26. The controlled attenuator 52 is coupled to IF amplifier 56 and second bandpass filter 58 which respectively amplify and band-limit the IF signal. Splitter 60 performs impedance matching for coupling the IF signal respectively to level detector 62, 360 degrees phase detector 64, and signal combiner 66, which may be a summing amplifier, for example. Level detector 62 generates a signal representing the difference between the IF signal level and a reference signal level.

The frequency cancelling circuit 40 is coupled to receive the fundamental RF frequency generated by RF oscillator 22 at amplifier 68. Amplifier 68 and frequency doubler 70, coupled thereto, respectively amplify and shift the RF signal to a frequency at twice the fundamental RF frequency. Second mixer 72 multiplies the doubled frequency RF signal with the output of local oscillator 48 to generate an IF reference signal which is at the same frequency as the IF signal output of first mixer 46. The output of second mixer 72 is coupled to phase shifter 76 through IF bandpass filter 74.

Phase shifter 76 also receives the output of sample and hold circuit 78 which is operated under control of control unit 54. Phase shifter 76 shifts the phase of the IF reference signal output of second mixer 72 and couples that signal through automatic level controlled (ALC) amplifier 80 and switch 82 to 360 degrees phase detector 64, such that the phases of the phase-shifted IF reference signal and the IF signal output of splitter 60 are 180 degrees apart. ALC amplifier 80 controls the signal level of the IF reference signal.

Under control of control unit 54, switch 82 decouples the IF reference signal from 360 degrees phase shifter 64 and signal combiner 66 when the level of the IF interference signal is below a predetermined threshold for application of the frequency cancelling circuitry.

The phase-shifted IF reference signal output by phase-shifter 76 is also coupled through switch 82 and phase trimmer 84 to level difference detector 86. Phase trimmer 84 provides final adjustment control over the phase-shifted IF reference signal. Level difference detector 86 is also coupled to the IF interference signal through splitter 60 and is used to generate an error signal representing the difference between the levels of the incoming IF signal and the IF reference signal output by the phase shifter 76 through phase trimmer 84.

The frequency cancelling circuitry 40 of the present invention operates as follows. During an adjustment phase of operation in which the fundamental RF frequency is being broadcast to the RFID tags, but no communication signals are being received yet therefrom, a baseline RF signal is received through antenna 34 at mixer 46 which represents the sum of the interference signals emitted by the RFID tags (and any other sources). The mixer 46 downconverts the incoming RF signal to IF, and bandpass filter 50 then selects the IF signal such that only the RF harmonic frequency as downconverted to intermediate frequency remains and is passed to controlled attenuator 52.

Initially, during a first adjustment phase of operation, level detector 62 produces a difference signal representing the difference between the IF signal level and a predetermined reference signal level. Based on that difference signal, control unit 54 provides a control signal to raise or lower the attenuation setting of controlled attenuator 52.

During a second adjustment phase of operation, the fundamental RF signal from RF oscillator 22 is amplified, doubled and then downconverted by amplifier 68, frequency doubler 70, and mixer 72, respectively, using the frequency output by local oscillator 48, to provide an IF reference signal at the output of bandpass filter 74 which has the same frequency as the IF interference signal at controlled attenuator 52.

Next, controlled phase-shifter 76 shifts the IF reference signal nominally 180 degrees in phase. Based on the phases of the IF interference signal and the phase-shifted IF reference signal, the 360 degrees phase detector 64 produces a signal representing the deviation from the two signals being 180 degrees apart in phase. The deviation signal is input to sample and hold circuit 78 which completes the feedback control loop with phase-shifter 76 and causes phase-shifter 76 to adjust the phase of the IF reference signal to be most nearly 180 degrees apart from the phase of the IF interference signal.

During the final adjustment phase of operation, the phase of the phase-adjusted IF reference signal is held constant and a final adjustment is made to the level of the IF interference signal. This results in the IF interference signal and the IF reference signal being made equal in amplitude and opposite in phase. Under this condition, the output of combiner 66, which represents the combination of the IF interference signal with the IF reference signal, is minimized and is ideally zero.

Amplitude matching of the IF interference signal and the IF reference signal are performed during the final adjustment phase of operation by operation of controlled attenuator 52 in feedback relation with level difference detector 86. Any difference in amplitude detected between the phase-shifted IF reference signal output from phase trimmer 84 and the IF interference signal output from splitter 60 is minimized by the feedback control effected by control unit 54.

After each of the adjustment phases of operation are completed, the phase and amplitude control settings of the frequency cancelling circuit are maintained during the communication interval therefollowing such that the frequency cancelling circuit compensates for interference which continues at the same amplitude and phase in the communication interval. During the communication interval, the incoming RF signal from receiving antenna 34 (FIG. 2) is input to the frequency cancelling circuit 40. By operation of frequency cancelling circuit 40, the result of combining the IF input signal and the IF reference signal by combiner 66 produces an IF output signal which is nearly free of the IF interference signal which is emitted by RFID tags.

The combined IF output signal is then passed to AGC amplifier 42 where the interference compensated signal is raised to an appropriate level and then demodulated by IF demodulator circuit 44. This results in providing demodulated signal output to control processor 26. Control processor 26, in turn, converts the demodulated signal to digital form to permit transfer of the information contained therein to host computer over interface 27.

Finally, the frequency cancelling system 40 of the present invention is employed only as necessary for the level of interference which is detected. If, during the adjustment phase of operation, before the amplitude of the IF interference signal is adjusted, the IF interference signal level is lower than a predetermined threshold level, as measured by level detector 62, control unit 54 operates switch 82 to decouple the IF reference signal from the combiner 66. Thereafter, during the communication interval, no frequency cancellation is performed and the IF signal at the input to attenuator 52 is only amplified and filtered before being output by combiner 66.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for permitting improved reception of a communication signal transmitted at a communication carrier frequency in the presence of an interference signal which occurs at said communication frequency, comprising the steps of:

receiving said interference signal in the absence of said communication signal;

converting said received interference signal to a converted interference signal having an intermediate frequency;

generating a reference signal at said communication carrier frequency;

converting said reference signal at said carrier frequency to a converted reference signal at said intermediate frequency;

adjusting the phase of at least one of said converted interference signal and said converted reference signal;

adjusting the amplitude of at least one of said converted interference signal and said converted reference signal, such that said converted interference signal and said converted reference signal have equal amplitude at said intermediate frequency; and receiving said communication signal transmitted at a communication carrier frequency in the presence of an interference signal;

converting said communication signal to an intermediate frequency;

combining said converted communication signal with said converted reference signal to cancel said interference signal, thereby permitting improved reception of said communication signal.

2. The method of claim 1 wherein said reference signal is generated from the same signal source from which said interference signal is derived.

3. The method of claim 1 wherein at least one of said converted interference signal amplitude and said converted reference signal amplitude is adjusted in relation to a predetermined reference value.

4. The method of claim 1 wherein at least one of said converted interference signal amplitude and said converted reference signal amplitude is adjusted based on the difference between said converted interference signal amplitude and said converted reference signal amplitude.

5. The method of claim 1 wherein said phase-adjusting step is performed such that said converted interference signal and said converted reference signal are brought opposite in phase.

6. In a transceiver of a communication system wherein said transceiver transmits a fundamental frequency and receives a communication signal at a return frequency related to said fundamental frequency, a system for canceling an interference signal occurring at said return frequency to permit improved reception of said communication signal, comprising:

generating means for generating a reference signal at said return frequency;

phase-adjusting means for adjusting the relative phase difference between said interference signal and said reference signal;

amplitude-adjusting means for adjusting the amplitude of at least one of said received interference signal and said reference signal to make the amplitudes of said received interference signal and said reference signal equal at said return frequency;

combining means for combining said communication signal with said reference signal to cancel said interference signal, thereby improving the reception of said communication signal; and means operative to decouple said reference signal from said combining means when the amplitude of said interference signal lies below a predetermined threshold.

* * * * *